(No Model.) 4 Sheets—Sheet 2.
G. F. & W. N. KUHNS & P. S. BOLLINGER.
CORN PLANTING MACHINE.
No. 345,640. Patented July 13, 1886.
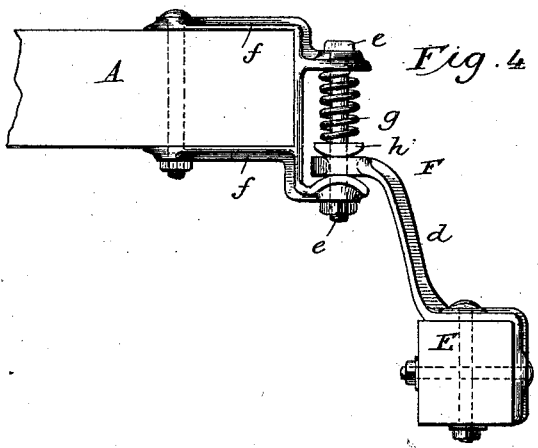
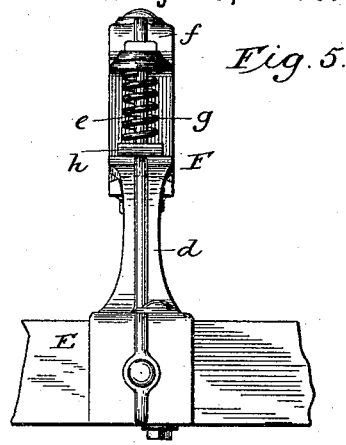
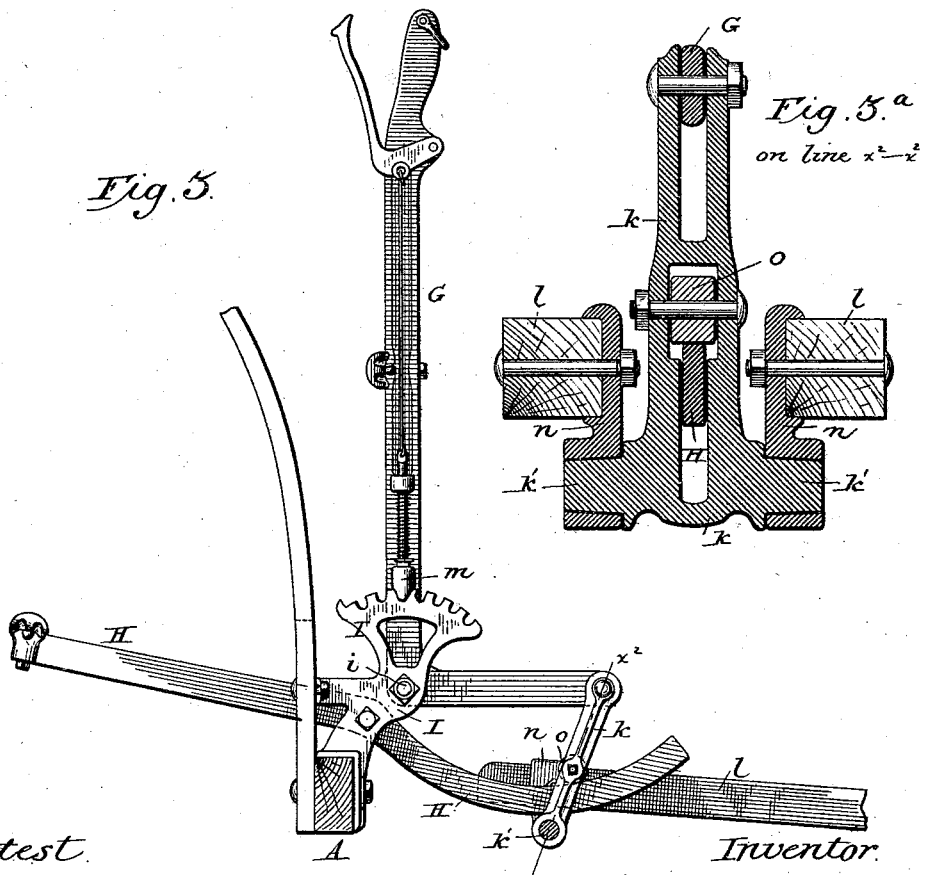
Attest:
Sidney P. Hollingsworth
Wm. P. Kennedy
Inventor:
Geo. F. Kuhns
W. N. Kuhns
P. S. Bollinger
By Phil. T. Dodge Atty (No Model.) 4 Sheets—Sheet 3.
G. F. & W. N. KUHNS & P. S. BOLLINGER.
CORN PLANTING MACHINE.
No. 345,640. Patented July 13, 1886.
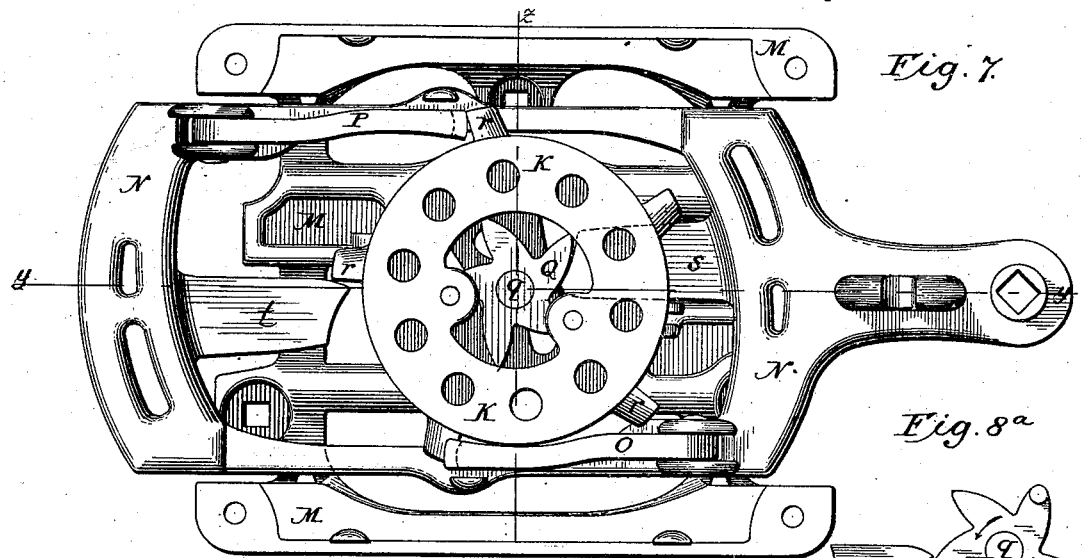
Fig. 7.
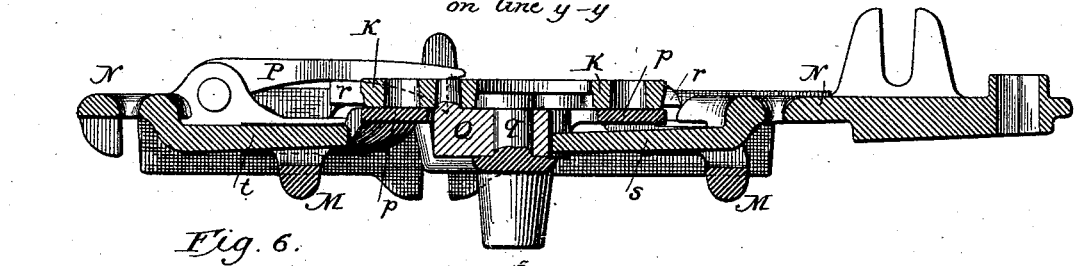
Fig. 8ª
Fig. 8. on line y–y
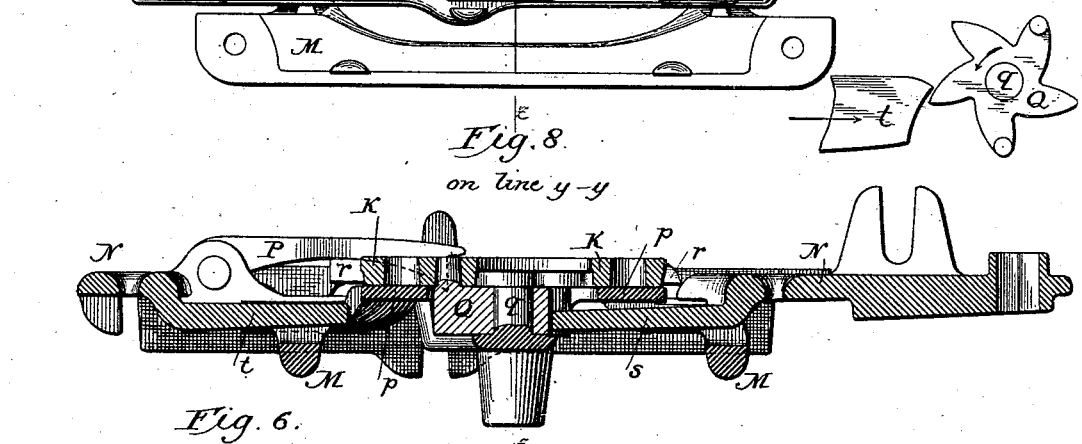
Fig. 6.
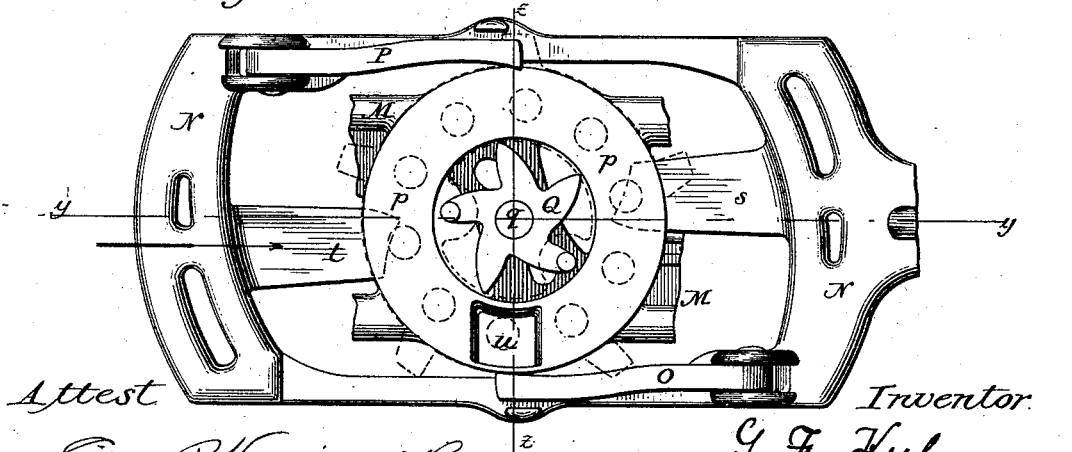
Attest
Sidney P. Hollingsworth
Wm R Kennedy
Inventor
G. F. Kuhns
W. N. Kuhns
P. S. Bollinger
By Phil. T. Dodge Atty
N. PETERS, Photo-Lithographer, Washington, D. C.

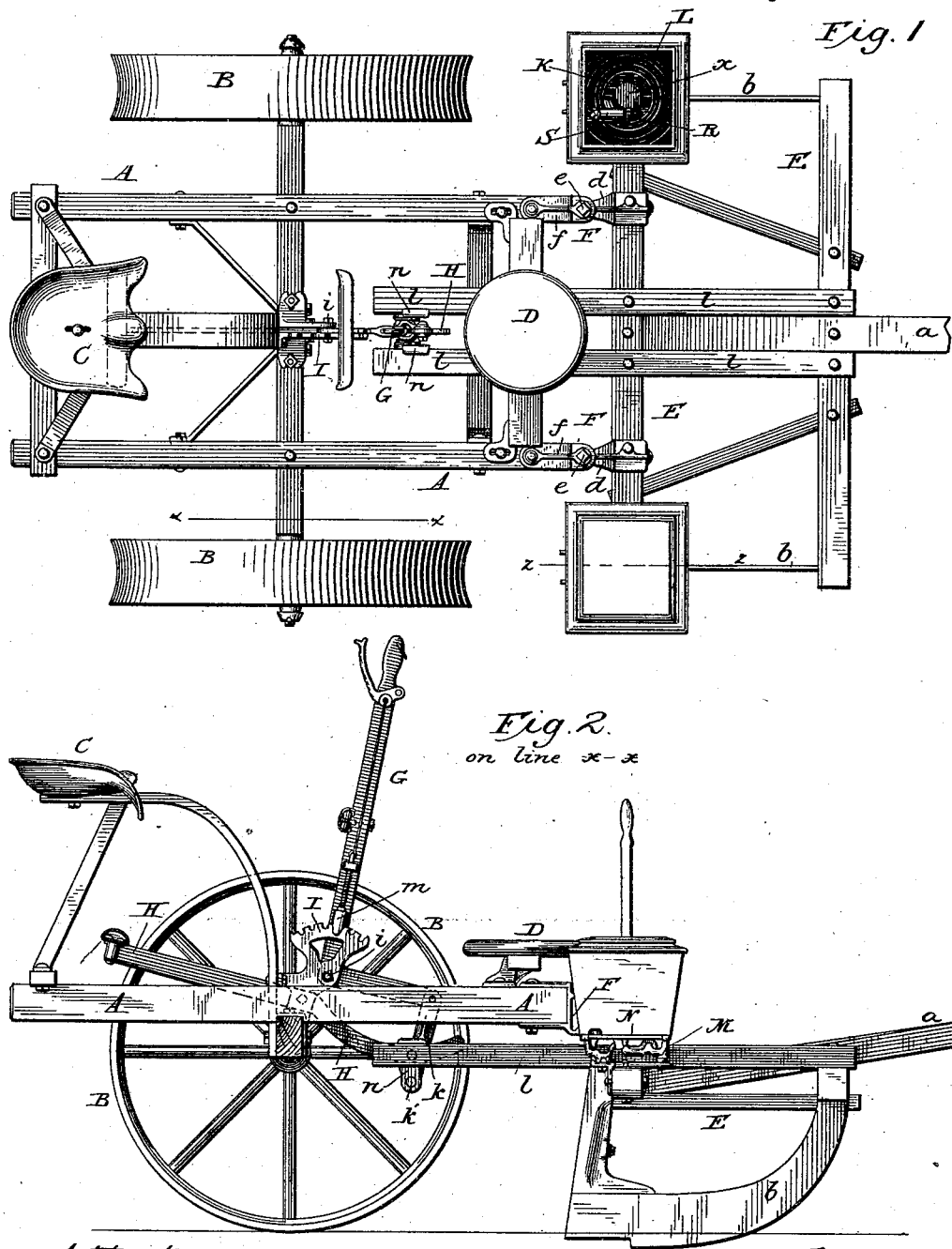

(No Model.) 4 Sheets—Sheet 4.
G. F. & W. N. KUHNS & P. S. BOLLINGER.
CORN PLANTING MACHINE.
No. 345,640. Patented July 13, 1886.
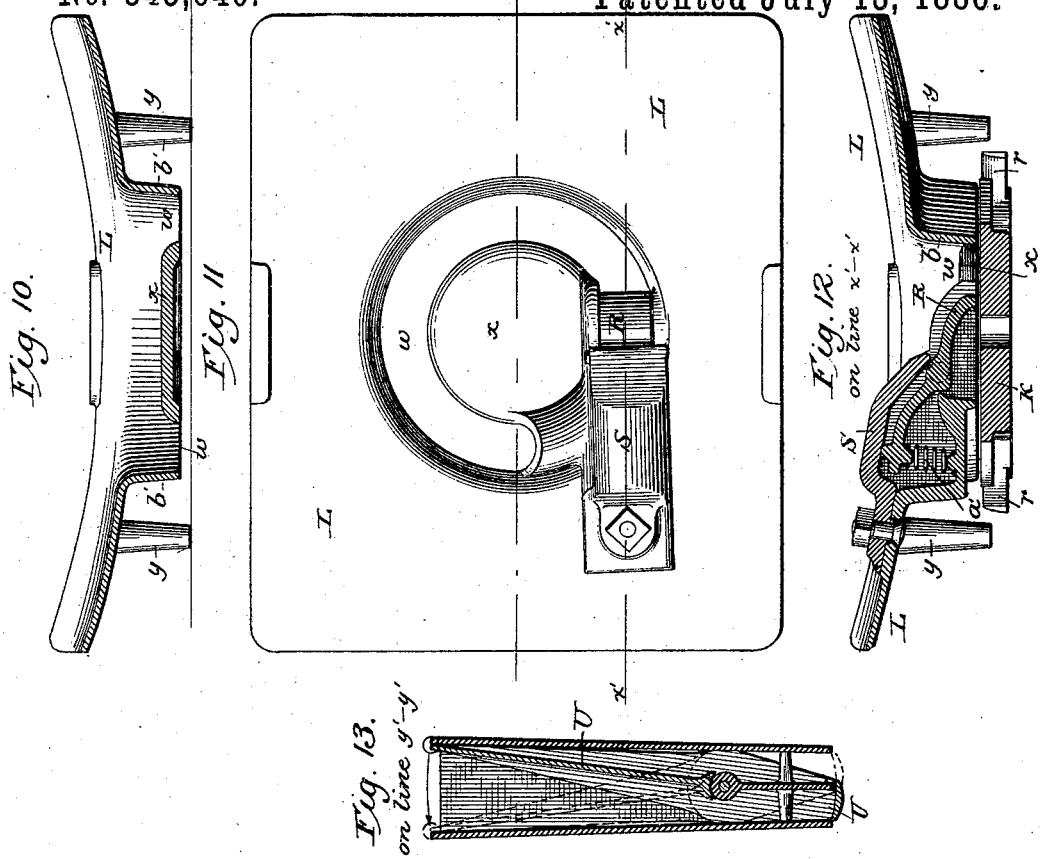
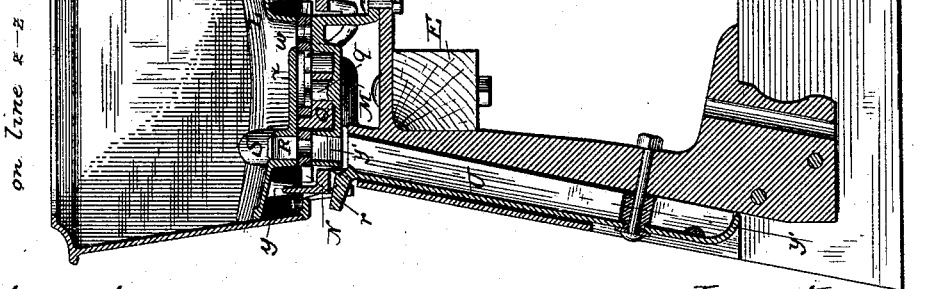

UNITED STATES PATENT OFFICE.

GEORGE F. KUHNS, WILLIAM N. KUHNS, AND PHARES S. BOLLINGER, OF DAYTON, OHIO, ASSIGNORS TO BENJAMIN KUHNS, OF SAME PLACE.

CORN-PLANTING MACHINE.

SPECIFICATION forming part of Letters Patent No. 345,640, dated July 13, 1886.

Application filed April 13, 1886. Serial No. 198,705. (No model.)

*To all whom it may concern:*

Be it known that we, GEORGE F. KUHNS, WILLIAM N. KUHNS, and PHARES S. BOLLINGER, of Dayton, in the county of Montgomery and State of Ohio, have invented certain Improvements in Corn-Planting Machines, of which the following is a specification.

Our invention has reference to that class of two-row planters in which a front frame provided with furrow-opening runners and seed-dropping mechanism is connected to a rear wheeled frame, the two being combined through the medium of flexible joints and adjusting devices under the control of the attendant, and in which the dropping of the seed is effected by means of intermittingly-rotating disks.

The invention consists in various improvements hereinafter specifically described, but more particularly to the construction of the joints by which the runner-frame and wheel-frame are united, to the construction and arrangement of levers for adjusting the runner-frame, and to various improvements in the dropping mechanism and their attendant parts.

In the accompanying drawings, Figure 1 represents a top plan view of our improved machine; Fig. 2, a longitudinal vertical section of the same on the line $x\ x$. Fig. 3 is a longitudinal vertical section on an enlarged scale, showing the construction and arrangement of the runner adjusting levers. Fig. $3^a$ is a vertical section on the line $x^2\ x^2$ of the preceding figure. Fig. 4 is a side elevation of one of the joints for connecting the runner and wheel frames. Fig. 5 is an end elevation of the same. Fig. 6 is a top plan view of one of the dropper-plates and the devices for moving and arresting the same, the driving-pawls being in their right-hand position. Fig. 7 is a similar view, with the guiding devices moved to the left. Fig. 8 is a longitudinal vertical section on the line $y\ y$ of Fig. 7. Fig. $8^a$ is a diagram showing the manner in which the reverse rotation is imparted to the dropper-plate. Fig. 9 is a transverse vertical section on the lines $z\ z$ of Figs. 1, 6, and 7, through one of feed mechanisms and the adjacent runner. Fig. 10 is a transverse vertical section through the bottom plate or grain-supporting plate of the hopper. Fig. 11 is a top plan view of the same. Fig. 12 is a cross-section of the same on the line $x'\ x'$. Fig. 13 is a vertical section on the line $y'\ y'$ of Fig. 9.

Referring to Figs. 1 and 2, A represents the rear or wheel frame, which may be of any ordinary or appropriate form, with a transverse axle having supporting-wheels B on its ends, and with a driver's seat, C, at the rear end and a dropper's seat, D, at the forward end.

E represents the front or runner frame provided, as usual, with a fixed draft-pole or tongue, $a$, and with two runners, $b$, to open the furrows in the usual manner.

The forward end of the wheel-frame is connected to the rear end of the runner-frame by two couplings, F, located at opposite sides, as shown, the construction being such as to permit the runners to tip both in a forward and backward direction, and also in a transverse direction to a limited extent that the runners may adjust themselves to undulations in the surface, as in other machines of this type. These couplings we construct in the improved manner represented in Figs. 4 and 5. Each coupling consists of an arm, $d$, extending upward and rearward from the runner-frame, and provided at its rear end with a vertical opening, through which there passes a vertical pivot-bolt, $e$, sustained at its upper and lower ends by ears projecting forward from a plate, $f$, attached rigidly to the wheel-frame. A spiral spring, $g$, encircles the pivot-bolt $e$, and, bearing under the upper ear of the plate $f$, holds the same normally in its elevated position, as shown in Fig. 4. The yielding action of the spring will, however, permit the arm $d$ to slide upward and downward on the pivot-bolt $e$, so that one side of the runner-frame may rise and fall independently of the other. We prefer to seat the lower end of the spring $g$ on a convex washer, $h$, which bears in turn on the arm $d$, and we also prefer to give the lower ear of the plate $f$ a rounded form on its upper surface, as shown in the drawings, this construction permitting the parts to play easily and smoothly upon each other. The rear end of the plate f is preferably made in a forked or divided form, as shown in Fig. 4, to embrace one of the bars of the wheel-frame, but it may be constructed in any other form which will admit of its being securely attached to the wheel-frame.

While it is preferred to make use of the spiral spring it is to be understood that the spring may be omitted, in which case the plate f will stand normally in its lower position with its upper ear bearing on top of the arm d. By withdrawing the two pivot-bolts e the runner-frame may be instantly disconnected from the wheel-frame.

For the purpose of adjusting and securing the runner-frame in the different positions demanded in operating and transporting the machine, we employ a hand-lever, G, and a distinct and independent foot-lever, H, both of which are pivoted to a supporting-plate, I, or other support secured to the wheel-frame, preferably to the axle thereof, as shown. The hand-lever G is made in an L form, mounted at its angle on a horizontal pivot, i, and jointed at its lower forward end to a link, k, which is in turn connected at its lower end to arms l, extending rearward from and forming a portion of the runner-frame, so that the movement of the hand-lever forward or backward will effect in a positive manner the raising and lowering of the runners. The hand-lever is provided with a locking-dog, m, operated by a thumb-latch in a familiar manner and engaging in notches in the upper edge of the stationary plate I, whereby the hand-lever may be locked to hold the runners in the position required. It will be noted that the plate or bracket I is cast complete in one piece with a base portion or flange bolted to the main frame, with the upper notched edge to receive the locking-dog, and with two upright arms or side pieces between which the levers are laid and which are adapted to give support to both ends of the lever-pivots. We prefer to construct the link k in the form represented in Fig. 3ᵃ, its lower end being provided with two outwardly-projecting trunnions or journals, k', which are seated in plates n, bolted firmly to the arms l of the runner-frame. The link k is located midway of the length of the runner-frame—that is to say, at equal distances from the two runners. This is advantageous in that the weight is equalized on the two sides, so that there is no tendency of one runner to drop below the other, as in those machines which have the lifting device connected at one side of the center. The maintenance of the runner-frame in a horizontal position is further insured by the fact that the link-bearings k' are widely separated from each other.

The foot-lever H is pivoted midway of its length or thereabout with its rear end in position to be conveniently depressed by the feet of the driver. It forward end, preferably curved, as shown, is passed through the link k, which is preferably but not necessarily provided with an anti-friction roller, o, to bear thereon. By means of the foot-lever the runners may be raised and lowered independently of the hand-lever, which, with its attendant parts, is relied upon mainly as a means of forcing the runners into the ground and holding the runner-frame in position after its adjustment.

We prefer to make the link in one piece, so that as the runner-frame rises the link moves backward on the foot-lever toward its fulcrum, thereby lessening the exertion required to complete the elevation of the runners; but a separate link may be made for both the hand-lever and foot-lever. When the foot-lever is made separate and distinct from the hand-lever, it may be pivoted, as shown, at a point in rear of the hand-lever, and the parts proportioned and arranged to permit an easier and more convenient operation than is attainable under the ordinary constructions.

It is manifest that the form of the link k and the details of its pivoted connection may be modified; but it is essential that the link and the levers shall be located centrally of the width of the machine, in order to avoid the tendency of one runner to work into the soil more deeply than the other.

Passing now to the seed-dropping mechanism, attention is directed to Figs. 1 and 2 and 6 to 12. Above the heel of each runner there is mounted a hopper or seed-dropper containing in its bottom the rotary disk K and attendant parts by which the seed is dropped through the tubular standard of the runner into the furrow beneath. The dropping mechanism consists of the horizontal rotary plate K, having the circular series of holes therethrough, as usual, an overlying plate or hopper-bottom, L, an underlying supporting-plate, M, and a reciprocating plate or frame, N, provided with pawls O P, which communicate motion to the dropper-plate. The supporting-plate M is cast complete in one piece with cross-arms to support the plate N, with a circular-raised surface, p, to sustain the dropper-plate, and with a central stud, q, forming a pivot for a star-wheel, Q, with which the stopping and reversing arms co-operate. This star-wheel is provided with upwardly-projecting studs, which enter holes in the removable dropper-plate, so that it turns with and forms in effect a part of said plate. The dropper-plate is provided at its periphery outside of the seed-cells with teeth r, with which the actuating-pawls O P engage alternately. These pawls are pivoted at their outer ends on opposite sides of the disk to opposite sides of the reciprocating frame or plate N, so that as they are carried to and fro they will act alternately and impart an intermitting rotation to the dropper-plate. In order to prevent the dropper-plate from being carried beyond the proper point by reason of its momentum we provide the slide N at opposite ends with two rigid inwardly-extending arms, s and t, which act alternately against the teeth of the star-wheel, Q to check its rotation and thereby stop the motion of the dropper-plate. In practice it sometimes happens that the operator or the check-rowing mechanism will fail to move the plate N the full limit of its scope, in which case the pawl, which is for the moment idle, will fail to engage the next tooth of the plate. The result is that the plate is left in such position that the parts will lock or bind and become inoperative. To avoid trouble in this regard we construct the parts so that it is impossible to place them in such position that they will lock or bind. This is secured by beveling the inner ends of the arms $s$ and $t$ and the teeth of the star-wheel Q in the manner represented in the drawings. If the dropper-plate stops before completing the proper movement, one of the teeth of the star-wheel will be presented, as shown in Fig. $8^a$, in position to be engaged by the approaching stop-arm $s$ or $t$. This arm, continuing its advance against the tooth, acts to turn the star-wheel backward, as indicated by the arrows in said figure, thus restoring the dropper-plate to its original position. It will be observed that under this construction the arms $s$ and $t$ are caused to perform the double purpose of arresting the advance of the dropper-plate at the proper points and of its turning backward whenever the pawls fail to impart the full movement thereto.

It is manifest that the details may be modified in many respects, which will suggest themselves to the skilled mechanic, without essentially changing the action of the devices in this regard or passing beyond the scope of our invention.

It is to be observed as a peculiarity of our feed mechanism that the driving-pawls operate at the periphery outside of the seed-cells, while the stopping or checking devices operate at the center inside of the line of the seed-cells. This construction is found in practice highly advantageous for various reasons unnecessary to enumerate herein, but particularly for the reason that it permits an exceedingly simple and compact arrangement of the parts. The seed entering the cells of the dropper-plate is prevented from falling therethrough by the underlying surface $p$ until the cells arrive successively at the openings $u$, where the seed escapes into the conductor below as in other machines of this class.

The plate or bottom-hopper, L, is cast complete in one piece, of the form shown in Figs. 9, 10, and 11. Its margin is adapted to fit snugly against the inner walls of the hopper. From its outer edges it is depressed toward the center, where it is formed with an opening, $w$, affording the seed access to the cells of dropper-plate, and with a central plate, $x$, which relieves the dropper-plate at its middle from the weight of the grain above. Near its upper edge the plate L is provided with downwardly-extending feet or projections $y$, which bear upon the plate M. These feet support the plate L firmly in position and prevent it from coming in frictional contact with the dropper-plate.

To prevent the seed from flowing directly downward through the dropper-plate into the discharge-opening, we employ a yielding cut-off plate, R. This cut-off or tongue is provided midway of its length with horizontal journals seated in recesses formed in the upper side of the plate L. At one end it overlies the discharge-opening $u$. At the opposite end it bears upon a lifting-spring, $a'$. Both the spring and the rear end of the cut-off are seated in a pocket or depression formed in the upper side of the plate L, and extended downward below its face, as shown. A plate, S, secured to the plate L by a bolt or screw overlies the cut-off and serves the double purpose of keeping its journals in their bearings and of limiting motion. By seating the cut-off in a pocket which is extended downward below the plate L, we are enabled to avoid that obstruction to the flow of the grain which would exist if the parts were located wholly above the plate L.

It will be observed that in order to afford room for the pawls and other parts which project above the level of the dropper-plate the body of the plate L is elevated and an annular flange, $b'$, projected downward therefrom around the periphery of the dropper-plate. The fact that the body of the plate L is located at a considerable distance above the dropper-plate would prevent the cut-off, if applied to the upper face of the plate L, from reaching and acting upon the dropper. It is partly for this reason that we provide the plate L with a pocket to receive the cut-off. It is to be noted in this connection that the pocket is made of a very considerable depth and extends below the under face of the plate L, and that the cut-off is lowered so that its upper face is flush or substantially flush with the plate L, and its end brought in suitable relation to the dropper-plate.

We are aware that a cut-off has been seated between flanges on the top of a bottom plate and secured by an overlying cap, and this we do not claim.

In connection with the dropper-plate and the seed-tubes we employ, as usual, a vibrating valve, U, pivoted in the seed-tube and engaging at its upper end with a reciprocating frame or slide, N. This valve operates, as in other machines, to arrest each charge of seed at a point near the surface of the ground, so that when released it will have but a short distance to fall. The valve shown in the drawings is of a form substantially the same as others at present known in the art.

We are aware that a spring has been used in connection with a central adjusting-lever in a corn-planter, the two frames of which were united by draft-connections independent of the lever.

We believe ourselves to be the first to construct corn-planters in which the front and rear frames are connected by draft devices or couplings containing springs which tend to prevent one frame from tipping or tilting sidewise in relation to the other; or, in other words, we believe ourselves to be the first to introduce between the front and rear frames of a corn-planter couplings through which the rear frame is drawn and which contain springs to resist the rising motion of the runners, and it will be manifest to the skilled mechanic that the details of construction may be variously modified without changing, essentially, the mode of action or passing beyond the limits of our invention.

Having thus described our invention, what we claim is—

1. In a corn-planter having a runner-frame jointed to the forward end of a wheel-frame, a hand-lever for elevating or depressing the runner-frame pivoted to the main frame and hinged to the runner-frame, in combination with a foot-lever centrally and separately pivoted to the main frame for elevating the runner-frame, substantially as for the purpose set forth.

2. In a corn-planter, a hand-lever for elevating or depressing the runner-frame, pivoted to the main frame and jointed at its forward end to the runner-frame, in combination with a foot-lever centrally and independently pivoted to the main frame, and a loose connection between the front end of the foot-lever and the runner-frame, substantially as and for the purpose set forth.

3. In a corn-planter having a runner-frame jointed to the front of a wheel-frame, a foot-lever pivoted to the wheel-frame and jointed at its forward end centrally to the runner-frame, a hand lever separately pivoted to the wheel-frame and jointed to the runner-frame, and locking devices, substantially as described, for securing said hand-lever in different positions.

4. In a corn-planter having a runner frame and a wheel-frame jointed together, the hand-lever jointed to the wheel-frame, in combination with the link pivoted to the lever and provided at its lower end with widely-separated bearings or journals connected to the runner-frame, and the independent foot-lever also connected to said link.

5. The runner-frame and wheel-frame jointed together, in combination with the hand-lever, and the independent foot-lever, both pivoted to the wheel-frame, and a connecting-link provided with the central opening for the foot-lever, and with two journals or trunnions engaging bearing-plates on the runner-frame.

6. The wheel-frame and the runner-frame jointed thereto, in combination with the hand-lever, the independent foot-lever, and the link connected to the runner-frame, the hand-lever, and the foot-lever.

7. In a corn-planter, the wheel-frame and the runner-frame, in combination with the foot-lever having its forward end curved, as described, and the link attached to the runner-frame, and provided with a roller riding on the foot-lever, as described.

8. The coupling for uniting the wheel-frame and runner-frame of a planter, consisting of the perforated arm, the vertical pivot passing therethrough, and the plate provided with ears sustaining the two arms of the pivot.

9. In a corn-planter, the combination of a runner-frame, a wheel-frame, and two couplings uniting them, each coupling consisting, essentially, of a vertical pivot attached to one of the frames, and a perforated arm attached to and above the other frame and arranged to slide vertically upon the pivot.

10. In a corn-planter coupling, the combination of the vertical perforated arm $d$, the plate $f$, having the forward ears, the vertical pivot $e$, and the spring $g$.

11. In combination with the perforated arm $d$, the plate $f$, having the two ears, the lower ear with a rounded upper face, the vertical pivot-bolt $e$, the spring $g$, and the collar $h$, seated between the spring and the arm $d$, and rounded on its lower face.

12. In a seed-dropping mechanism, a rotary dropper-plate provided with a circular series of cells, in combination with a reciprocating slide provided with driving-pawls, which engage the plate outside of the seed-cells, and with stops which act inside of the seed-cells, substantially as described.

13. A rotary dropper-plate provided with driving-teeth at its periphery, and with stop-teeth at the center, in combination with a reciprocating frame provided with driving-pawls to engage the outer teeth, and with stop-arms to engage the inner teeth.

14. In a corn-planter, the combination of the stationary plate $p$, the rotary dropper-plate provided with external teeth above said plate, the stop-teeth located centrally below the stationary plate, and the reciprocating slide provided with pawls engaging the peripheral teeth of the dropper-plate, and with stops below the stationary plate to engage the stop-teeth, as described.

15. In a corn-planter, the combination of the rotary dropper-plate, provided with driving-teeth, a star-wheel, Q, or equivalent stop-teeth, secured to the dropper-plate, and a reciprocating frame provided with driving-pawls to advance the plate, and with inwardly-projecting stop-arms to encounter the star-wheel, said wheel and arms constructed, as described, to effect a reverse rotation of the dropper-plate whenever the driving-pawls fail to impart a full movement thereto.

16. In combination with a dropper-plate having a stop-wheel or stop-teeth thereunder, reciprocating arms, substantially as described, acting in connection with said stops to turn the dropper-plate backward to its original position whenever it falls to advance to the proper point.

17. In combination with the rotating dropper-plate, having thereunder the star-wheel or teeth beveled, as described, the reciprocating frame provided with driving-pawls and with stop-arms *s* and *t*, said arms constructed, as described, to serve the purpose of arresting the advance of the dropper-plate.

18. In combination with the rotary dropper-plate having peripheral teeth, the reciprocating plate or frame N, having lugs on its top face, the driving-pawls O P, pivoted to said lugs and engaging the dropper-plate on opposite sides, and the concave covering-plate L, cast in one piece with the central plate, *x*, and with the depending flange encircling the edge of the dropper-plate, as shown, whereby a free action of the driving-pawls is permitted.

19. In combination with the rotary dropper-plate, the overlying plate L, provided with the annular depending flange at the center, and with the recess extended downward within the dropper-plate from its upper face and below the level of its under face to receive the cut-off, whereby the cut-off may be brought in proper relation to the dropper-plate, although the body of the covering-plate is widely separated therefrom.

20. In combination with the cut-off plate R, provided with journals at its middle, the covering-plate L, provided with the recess sunk below its upper surface and adapted to receive the cut-off and its journals, the spring *a'*, and the cap-plate S, said parts constructed and arranged as described.

21. The standard or bracket I, cast complete in one piece with the flanged base, the notched upper edge, and the two upright arms adapted to sustain the two ends of the lever-pivots.

22. In a corn-planting machine, the combination, with a wheeled frame and a front runner-frame, of elastic or yielding connections, substantially as described, whereby the wheeled frame is drawn and the lateral tipping motion of one frame in reference to the other resisted.

23. The combination, in a corn-planter, of a front runner-frame, a rear wheeled frame, and two intermediate springs applied on opposite sides of the machine, and tending to resist the lateral tipping motion of one frame in relation to the other.

In testimony whereof we hereunto set our hands, this 27th day of March, 1886, in the presence of two attesting witnesses.

GEORGE F. KUHNS.
WILLIAM N. KUHNS.
PHARES S. BOLLINGER.

Witnesses:
WALTER S. WOLLASTON,
WARREN MUNGER.